United States Patent [19]

Haerle

[11] Patent Number: 5,215,724
[45] Date of Patent: Jun. 1, 1993

[54] SINTERED COMPOSITE FILTER

[75] Inventor: Hans A. Haerle, Bopfingen, Fed. Rep. of Germany

[73] Assignee: Schwabische Huttenwerke GmbH, Fed. Rep. of Germany

[21] Appl. No.: 755,168

[22] Filed: Sep. 5, 1991

[30] Foreign Application Priority Data

Sep. 20, 1990 [DE] Fed. Rep. of Germany ....... 4029749

[51] Int. Cl.$^5$ ............................................. B01D 53/36
[52] U.S. Cl. ..................................... 422/180; 422/177; 422/181; 60/299; 55/329; 55/330; 55/485; 55/523; 55/524; 55/525; 55/DIG. 30; 502/87; 502/439; 502/527
[58] Field of Search ............... 422/122, 177, 181, 180; 60/299; 55/329, 330, DIG. 30, 485, 523, 524, 525; 502/439, 527, 87

[56] References Cited

U.S. PATENT DOCUMENTS

| | | |
|---|---|---|
| 2,267,918 | 12/1941 | Hildabolt . |
| 3,087,233 | 4/1963 | Turnbull . |
| 3,161,478 | 12/1964 | Chessin . |
| 3,306,353 | 2/1967 | Burne . |
| 3,904,551 | 9/1975 | Lundsager et al. . |
| 4,062,807 | 12/1977 | Suzuki . |
| 4,064,914 | 12/1977 | Grant . |
| 4,183,896 | 1/1980 | Gordon ............................. 422/177 |
| 4,301,012 | 11/1981 | Puckett . |
| 4,329,162 | 5/1982 | Pitcher, Jr. . |
| 4,515,758 | 5/1985 | Domesle et al. . |
| 4,652,286 | 3/1987 | Kusuda et al. . |
| 4,662,915 | 5/1987 | Shirai et al. . |
| 4,687,579 | 8/1987 | Bergman . |
| 4,725,411 | 2/1988 | Cornelison . |
| 4,732,593 | 3/1988 | Kondo et al. . |
| 4,758,272 | 7/1988 | Pierotti et al. . |
| 4,760,047 | 7/1988 | Jeschke et al. . |
| 4,847,230 | 7/1989 | Cyron ................... 502/439 |
| 4,889,630 | 12/1989 | Reinhardt et al. . |
| 4,971,769 | 11/1990 | Haerle . |
| 4,981,172 | 1/1991 | Haerle . |
| 5,009,857 | 4/1991 | Haerle . |
| 5,062,263 | 11/1991 | Carboni ................... 60/299 |

FOREIGN PATENT DOCUMENTS

| | | |
|---|---|---|
| 42301 | 6/1980 | European Pat. Off. . |
| 54-128842 | 10/1979 | Japan . |
| 54-152241 | 11/1979 | Japan . |
| 61-287451 | 6/1985 | Japan . |
| 62-225221 | 3/1986 | Japan . |

Primary Examiner—Lynn M. Kummert
Attorney, Agent, or Firm—Welsh & Katz, Ltd.

[57] ABSTRACT

A filter for removing impurities from waste gases, and especially from the waste gases of an internal combustion engine, includes a filter body consisting of a plurality of compression moulded, high temperature resistant, sintered filter plates consisting of metal powder, metal chips, metallic fibres or a mixture of these materials, which are arranged on top of or behind one another and kept at a distance from one another by spacers, to form between them a plurality of flow channels. The flow channels are open at one end and closed at the other end in order to form inlet and outlet channels. The walls of the filter plate situated between the inlet and outlet channels constitute filter surfaces. The filter plates are formed by filter discs lying on top of one another, arranged in a filter housing and having a free or open central interior space, so that the waste gases flow radially through the filter discs from the outside towards the interior space or from the interior space towards the outside.

14 Claims, 2 Drawing Sheets

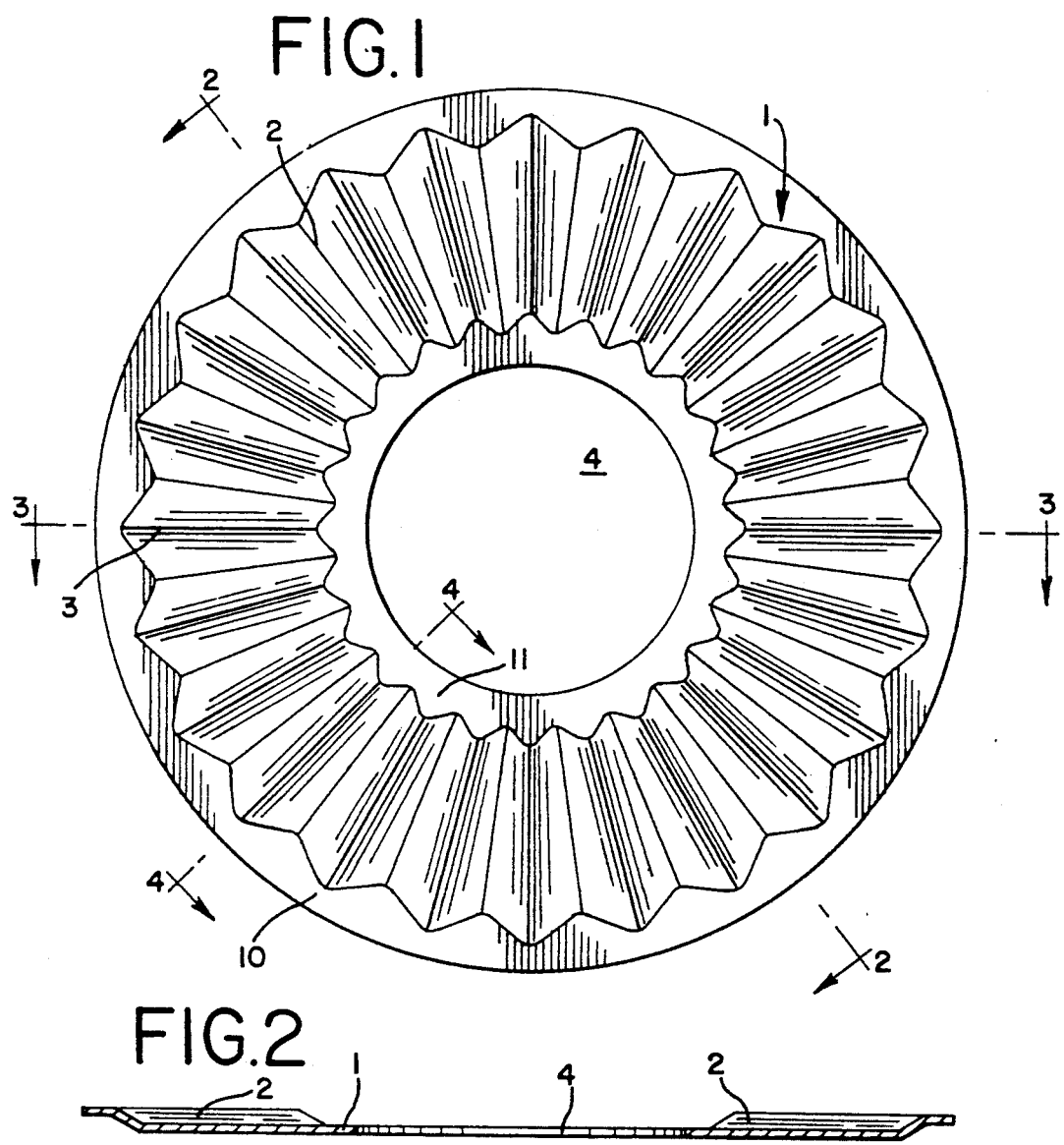
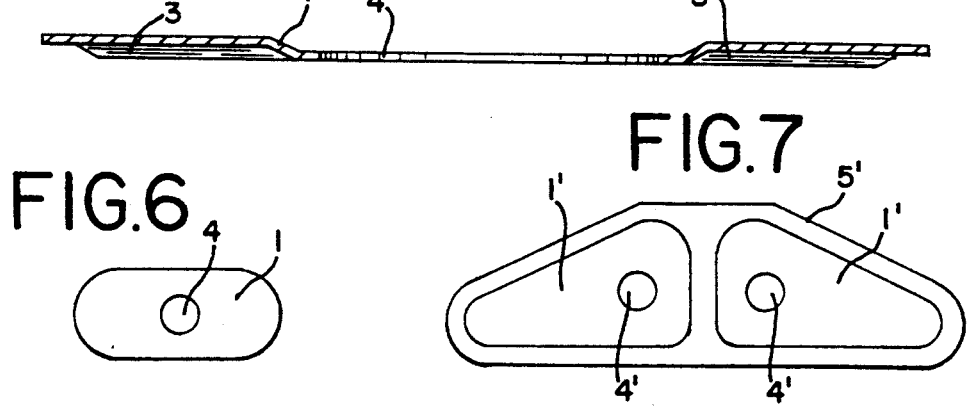

SINTERED COMPOSITE FILTER

BACKGROUND OF THE INVENTION

The present invention relates to a filter of the type for removing impurities from waste gases, and especially from the waste gases of an internal combustion engine.

The two prior West German patent applications, P 39 01 609.9, and P 39 37 809.8 by the same applicant already propose such filters consisting of a plurality of compression moulded, high temperature resistant, sintered filter plates. The waste gases flow through the filter plates in the axial direction.

The object of this invention is to design or to further improve filters of this type. In particular, improved adaptation to local conditions should be possible.

SUMMARY OF THE INVENTION

This problem is solved according to the invention by the features specified in the characterising part of claim 1.

According to the invention, the waste gases now flow radially through the filter discs, either from the outside towards the inside or from the inside towards the outside.

In this manner, depending on the local conditions, the filter may, e.g. if desired, be arranged even more closely on the motor, resulting in reduced cooling of the waste gases to be purified. As a result of the relatively high temperature then prevailing in the filter body, it is possible, e.g. to achieve improved soot conversion and improved catalytic action.

A further advantage of the filter design according to the invention consists in that the filter body can be extended to the desired size in a modular manner.

In a structurally advantageous embodiment of the invention, it may be provided that at least one feed channel opens into the intermediate space between the filter housing and the circumferential walls of the filter discs, and that the central interior space constitutes the waste gas channel.

In particular, by virtue of this design, the filter according to the invention can be arranged very closely on the motor, as the feed channel may, if desired, be in direct communication with the cylinder outlets or may be connected thereto via short pipe bends.

In a development of the invention, it may be provided that the spacers are formed by ribs, beads or the like moulded into the filter discs.

The ribs and beads may simultaneously assume a guiding function for the flow direction of the waste gas.

In one embodiment it may also be provided that the filter discs have a wavelike form and the crests and troughs of the waves form the spacers for the filter discs lying on top of one another.

A very advantageous and unobvious development of the invention consists in that the spacers are curved like guide blades in the radial direction and that the feed channel opens into the filter housing at an incline in relation to the radial direction.

By virtue of this design of the filter discs, improved flow characteristics are obtained in the filter, this having a positive effect on the filter and motor performance. This applies in particular when the feed channel opens tangentially into the filter housing.

A structurally simple design for the filter discs, and therefore one which is particularly suitable for series production, is obtained when these are dish-shaped.

However, as a result of the fact that the filter discs are produced in the form of compression moulded, sintered bodies, it is also possible, if necessary, to produce the filter discs in any desired shape, so that they are even better adapted to the local conditions. In this manner, e.g. oval or ellipsoidal shapes may be provided.

In addition, in order to save space and/or to increase the degree of efficiency of the filter, it is also possible to arrange two or more stacks of filter discs alongside one another in a common filter housing. In this case, the filter discs need not have a circular, oval or elliptical shape and may in fact have any appropriate shape in accordance with the local conditions.

The individual filter discs arranged on top of one another can be connected together to form a uniform filter body in various ways. E.g. the filter discs can be compression moulded and then sintered together by a common sintering process, or the compression moulded, sintered filter discs can be welded together or connected together by means of mechanical links.

The mechanical links may be, e.g. clamps, as described in prior West German patent application P 39 37 809.8.

In addition, the inner and outer edges of the filter discs may be provided alternately with folds, each bent over in an appropriate manner to ensure a connection between filter discs lying adjacent to one another.

In a further development of the invention, it may be provided that catalyst plates are arranged in the outlet channels or that the filter walls in the outlet channels are coated with catalytic materials.

By virtue of this design, following soot conversion in the filter walls of the waste gases purified in this manner, further harmful constituents, e.g. carbon monoxide and hydrocarbon, can also be removed from the waste gases.

In a further development of the invention, it may also be provided that the filter discs are coated with catalytic materials on the side of the inlet channels in order to reduce the soot conversion temperature.

The catalytic material used may be, e.g. manganese, molybdenum or the like, this reducing the soot conversion temperature and thereby increasing the efficiency of the filter in a corresponding manner.

BRIEF DESCRIPTION OF THE DRAWINGS

Several embodiments of the invention will now be described in principle with reference to the accompanying drawings, in which:

FIG. 1 is a top view of a filter disc according to the invention;

FIG. 2 is a section along the line II—II of FIG. 1;

FIG. 3 is a section along the line III—III of FIG. 1;

FIG. 6 is a top view showing the principle of another filter disc design on a very reduced scale, and FIG. 7 is a top view showing the principle of a waste gas filter comprising two stacks of filter discs in a common filter housing.

DESCRIPTION OF THE PREFERRED EMBODIMENTS

Figure 4:
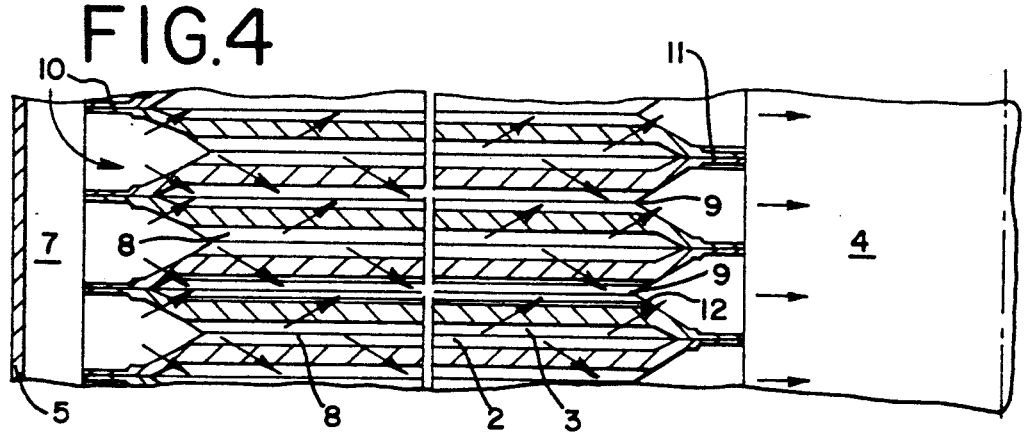
FIG. 4 is a half section on an enlarged scale through several filter discs along the line IV—IV of FIG. 1.

The filter body according to the invention consists of a plurality of individual filter discs 1 arranged on top of one another, connected together by means of welding, a sintering process or by means of mechanical links to form one unit (see FIG. 4). E.g. the outer and inner edges, 10 and 11 respectively of the filter discs lying flat on top of one another may serve to this end. The top surface of each filter disc 1 has a wavelike form, provided with successive raised ribs 2 (FIGS. 1 and 2) recessed (FIGS. 1 and 3) beads 3. Each filter disc 1 has a free or open central interior space 4 forming a coaxial bore.

Figure 5:
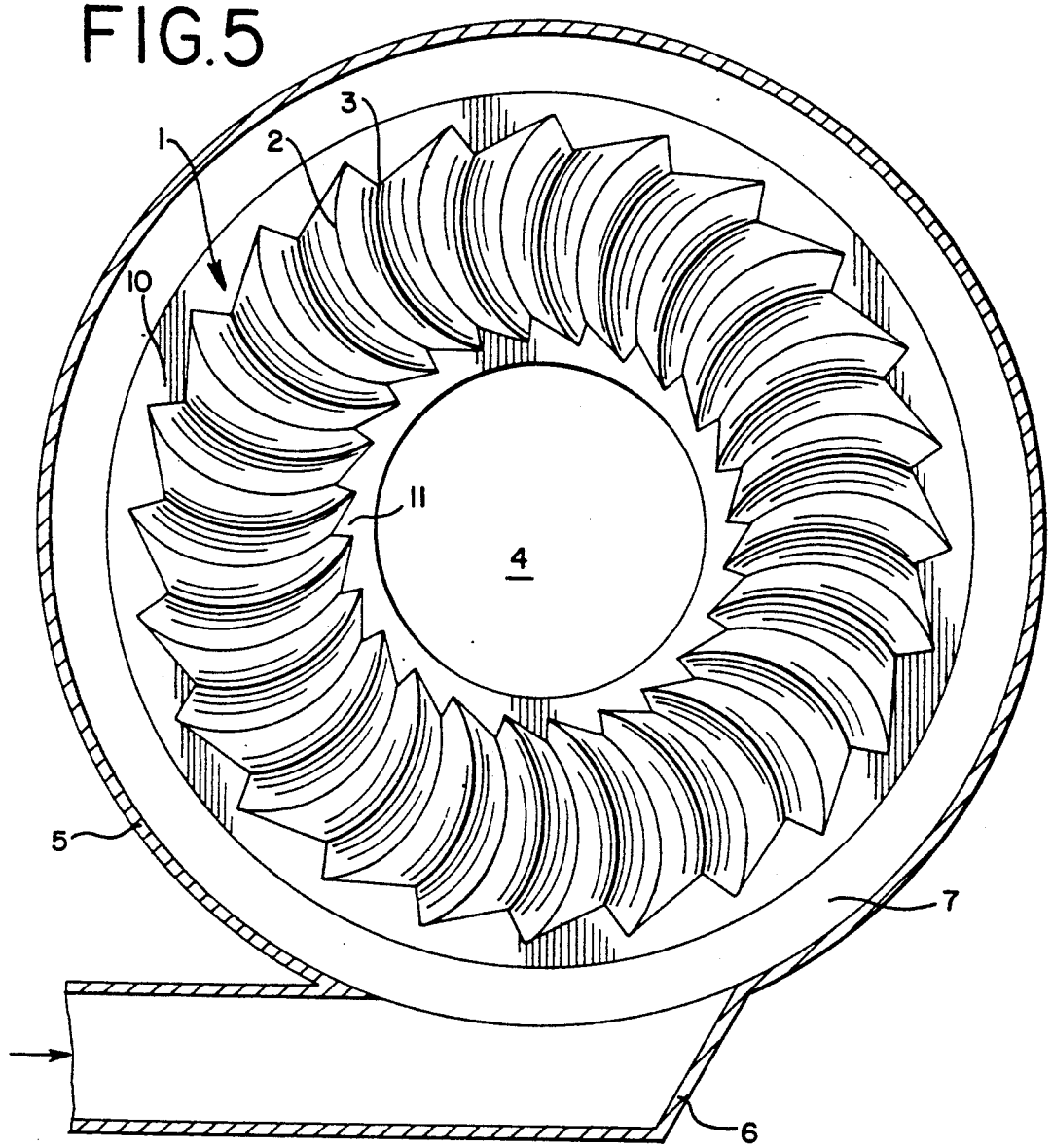
FIG. 5 is a top view of another filter disc design with the filter housing.

The filter discs 1 arranged on top of one another and connected together in any desired number are arranged in a filter housing 5 provided with a feed channel 6 (see FIG. 5). The feed channel 6 can open radially, at an incline or, as illustrated in FIG. 5, tangentially into an intermediate space 7 between the outer circumferential walls of the filter discs 1 and the inner wall of the filter housing 5.

As can be seen from FIG. 4, the filter discs 1 lying on top of one another are kept at a distance from one another by the raised ribs 2 and recessed beads 3 constituting spacers in such a manner that an alternating vertical axial sequence of inlet channels 8 and outlet channels 9 are produced. To this end, the filter discs 1 lying on top of one another are placed on top of one another in a mirror-inverted manner. The waste gases flowing into the intermediate space 7 then flow in the direction of the arrows, and as a result of the filter disc porosity, pass through the filter walls situated between the inlet and outlet channels 8 and 9, soot conversion or soot combustion then taking place.

In this connection, it simply has to be ensured that the filter walls have appropriately high porosity. To this end, the compression moulded, sintered filter plates are generally produced from sintered coarse-grained, metal powder or better still, sintered chip-like or fibrous metal filaments or a mixture thereof. E.g. fibre mats or fibre meshes formed of discontinuous or continuous metal chips, or metallic fibres can be used to this end.

It can be seen in FIGS. 1 and 5 that the raised ribs 2 and recessed beads 3 alternate radially around the filter discs to provide the wavelike form previously mentioned. Since the filter discs are placed on top of one another in a mirror-inverted manner, it will be realized when FIGS. 1 and 5 are considered in conjunction with FIG. 4, that the inlet channels 8 and the outlet channels 9 are also produced in an alternating radial sequence between adjacent filter discs and around the central interior space or bore 4.

In the embodiments illustrated, in which the waste gases flow radially through the filter discs from the outside towards the inside, the free or open interior space 4 forms the waste gas outlet channel.

Whereas the ribs 2 and beads 3 in the embodiment according to FIG. 1 are arranged in the radial direction, in the embodiment according to FIG. 5 they are curved like guide blades in relation to the radial direction, resulting in very good flow characteristics in association with the tangential feed channel.

In the embodiments according to FIGS. 1 and 5, the filter discs 1 are designed as dishes with a circular shape.

However, according to the reduced representation of FIG. 6, an oval shape is also possible, the filter discs 1 formed in this manner also being arranged in a correspondingly shaped filter housing.

FIG. 7 shows an embodiment in which two stacks of filter discs 1' each having a waste gas channel 4' are arranged alongside one another in a filter housing 5'. As can be seen, the filter discs are designed as irregular polygons or are kidney-shaped, having corresponding substantially rounded corners.

Of course any other desired shape is also possible for the filter discs 1 within the scope of the invention.

If necessary, the filter walls of the filter discs 1 directed towards the outlet channels 9 can be coated with a catalytic material 12 as shown in one channel 9 in FIG. 4. If, e.g. platinum, vanadium, rhodium or the like is used to this end, following separation or soot conversion in the filter walls, carbon monoxide, hydrocarbons and nitrogen can also be removed in a simple manner.

Instead of coating the filter walls, catalyst plates (not shown) can be inserted between abutting ribs 2 and beads 3 of filter discs lying adjacent to one another, the waste gases flowing over the top surfaces thereof on their way to the interior space 4.

I claim:

1. Filter for removing impurities from waste gases, such as the waste gases of an internal combustion engine, comprising a filter body including a plurality of compression molded, high temperature resistant, sintered filter plates having a high porosity structure comprising metal powder, metal chips, metallic fibers or a mixture thereof, which are arranged on top of or behind one another in a filter housing and spaced from one another by radially extending mating ribs and beads to thereby form between said plates a plurality of adjacent alternating radially disposed inlet and outlet flow channels defined by said ribs and beads, each of said inlet flow channels alternating with one of said outlet flow channels, the flow channels being open at one end and closed at the other end with surfaces of the filter plates situated between the inlet and outlet channels constituting filter surfaces for the passage of gas therethrough, and each of said filter plates having an open central interior space to allow the waste gases flowing through said filter body to pass in a substantially radial direction from the outside of said filter body through said flow channels towards the central interior space or in a substantially radial direction from the central interior space through said flow channels towards the outside of the filter body.

2. Filter according to claim 1 wherein at least one waste gas feed channel opens into an intermediate space between the filter housing and outer circumferential walls of the filter plates, and the central interior space comprises a waste gas outlet channel.

3. Filter according to claim 1 wherein said radially extending ribs and beads are molded into the filter plates.

4. Filter according to claim 3 wherein the filter plates have a wavelike form including a plurality of alternating radial wave crests and wave troughs which form the ribs and beads for the filter plates lying on top of or behind one another.

5. Filter according to claim 1 wherein said ribs and beads are curved like guide blades in the radial direction and a waste gas feed channel opens into the filter housing at an incline in relation to the radial direction.

6. Filter according to claim 5 wherein the waste gas feed channel opens tangentially into the filter housing.

7. Filter according to claim 1 wherein two or more stacks of filter plates are axially arranged alongside one another in the filter housing.

8. Filter according to claim 1 wherein the compression molded filter plates are sintered together to form a uniform filter body by a common sintering process.

9. Filter according to claim 1 wherein the compression molded, sintered filter plates are connected together by welding to form a uniform filter body.

10. Filter according to claim 1 wherein the compression molded, sintered filter plates are connected together by means of mechanical inks to form a uniform filter body.

11. Filter according to claim 1 wherein the filter surfaces in the outlet channels are coated with catalytic materials.

12. Filter according to claim 1 wherein the filter plates are coated with catalytic materials on the surfaces defining the inlet channels to thereby reduce the soot conversion temperature of waste gas passing therethrough.

13. Filter according to claim 1 wherein said plurality of filter plates provides an annular filter body having an alternating axial sequence of inlet channels and outlet channels.

14. Filter for removing impurities from waste gases, such as the waste gases of an internal combustion engine, comprising a filter body including a plurality of compression molded, high temperature resistant, sintered filter plates having a high porosity structure comprising metal powder, metal chips, metallic fibers or a mixture thereof, which are arranged adjacent one another and having substantially radially extending rib means for forming and defining curved substantially radial flow channels between adjacent ones of said plates, each of said flow channels being open at one end and closed at the other end in order to form alternating inlet and outlet channels, with surfaces of the filter plates situated between the inlet and outlet channels constituting filter surfaces for the passage of gases therethrough, and each of said filter plates having an open central interior space to allow the waste gases flowing through said filter body to pass in a substantially radial direction from the outside of said filter body through said flow channels toward the central interior space or in a radial direction from the central interior space through said flow channels towards the outside of the filter body.

* * * * *